Aug. 25, 1959
C. N. PETERSON
2,900,957
HOG OILER
Filed July 25, 1957
3 Sheets-Sheet 3
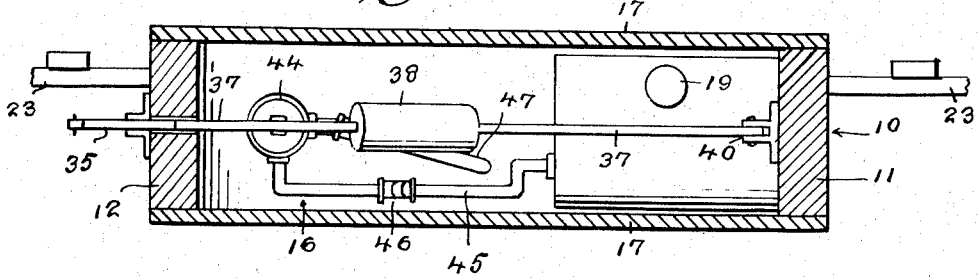
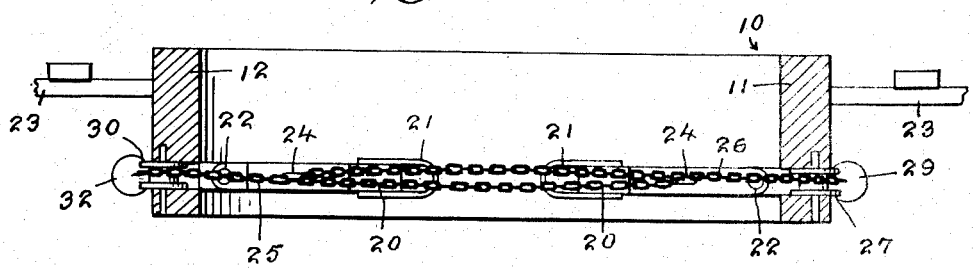
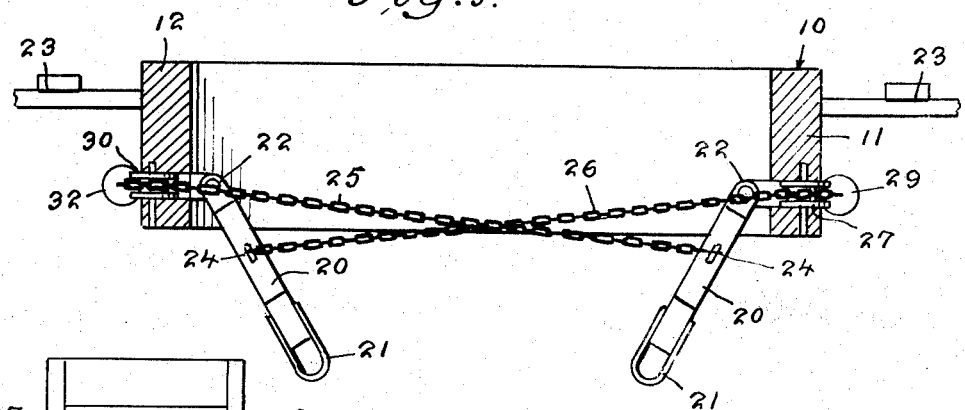
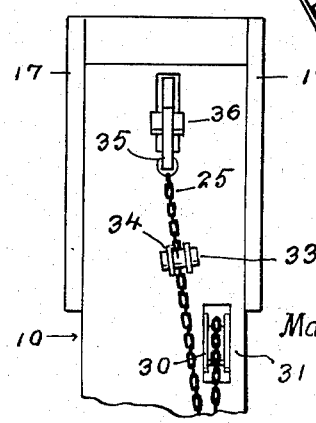
INVENTOR.
Clarence N. Peterson - Deceased
Marlan N. Peterson + Dolan N. Peterson - Administrator
BY Victor J. Evans & Co.
ATTORNEYS

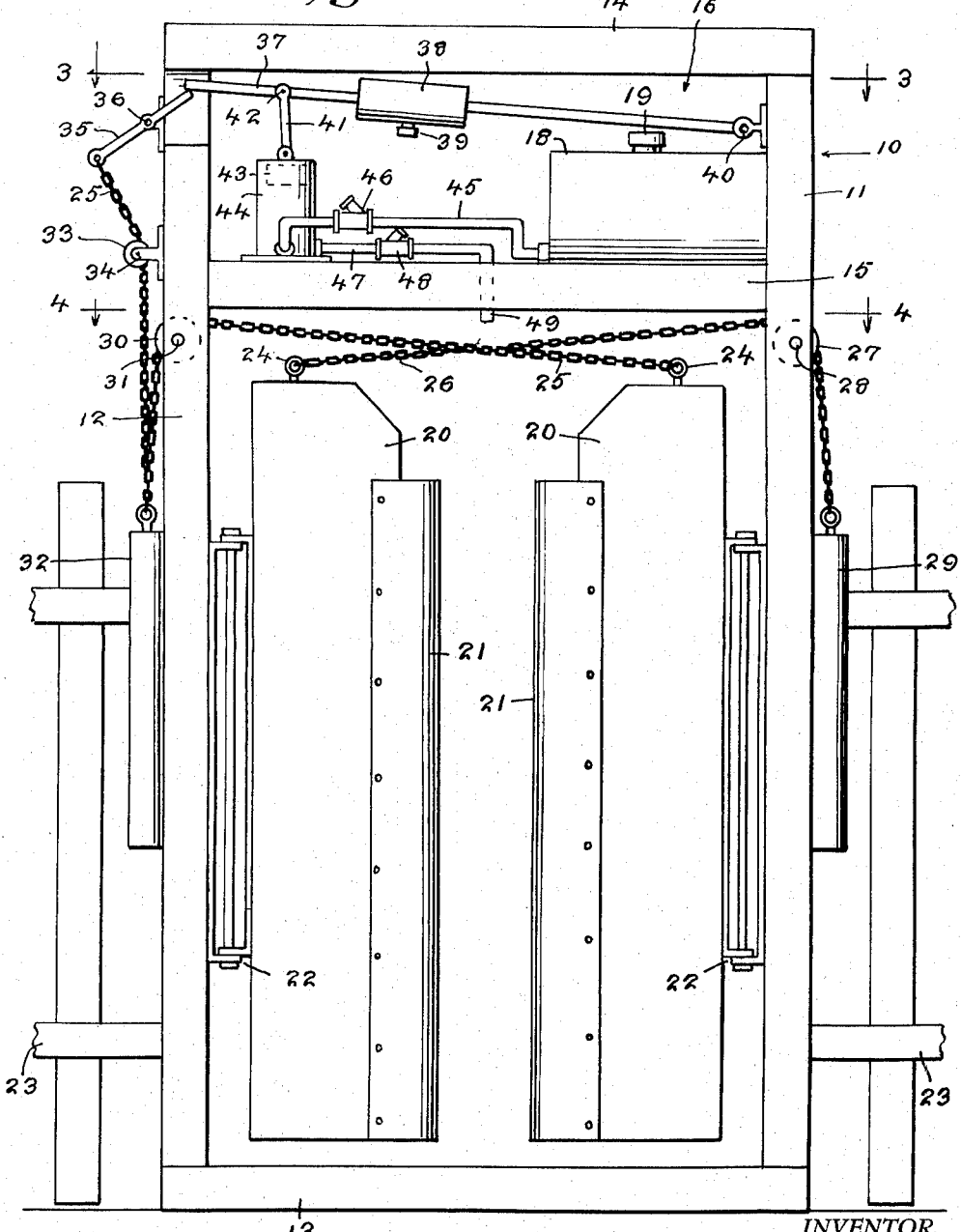

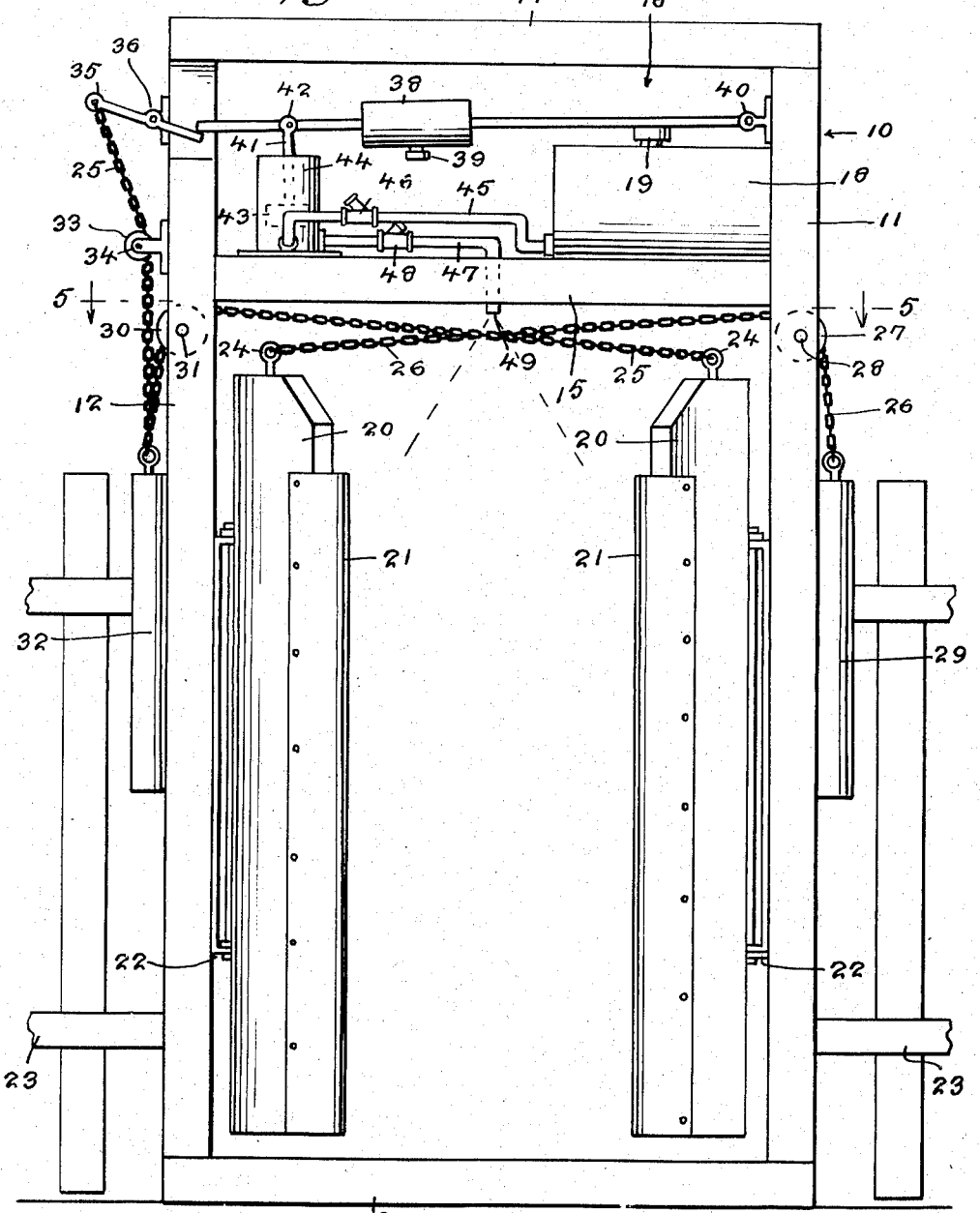

United States Patent Office 2,900,957
Patented Aug. 25, 1959

2,900,957

HOG OILER

Clarence N. Peterson, deceased, late of Grand Island, Nebr., by Marlan N. Peterson and Dolan N. Peterson, administrators, Gering, Nebr.

Application July 25, 1957, Serial No. 674,074

1 Claim. (Cl. 119—159)

This invention relates to a hog oiler.

The object of the invention is to provide a mechanism which will automatically apply fluid such as oil or the like to hogs.

Another object of the invention is to provide a hog oiler which is constructed so that as animals, such as hogs pass through swinging gates, a dispensing mechanism is automatically actuated whereby a predetermined quantity of oil is dispensed onto the animal.

Another object of the invention is to provide a hog oiler which is adapted to be actuated by swinging gates as the animals pass therethrough, and whereby the apparatus is easy to install and automatic in operation and ruggedly constructed so that it will not readily get out of order.

A further object of the invention is to provide a hog oiler which is extremely simple and inexpensive to manufacture.

Other objects and advantages will be apparent during the course of the following description.

In the accompanying drawings, forming a part of this application, and in which like numerals are used to designate like parts throughout the same:

Figure 1 is an elevational view showing the hog oiler of the present invention, with parts broken away and in section.

Figure 2 is a view similar to Figure 1, but showing the parts in adjusted position as when the gates are open.

Figure 3 is a sectional view taken on the line 3—3 of Figure 1.

Figure 4 is a sectional view taken on the line 4—4 of Figure 1.

Figure 5 is a view taken on the line 5—5 of Figure 2.

Figure 6 is a fragmentary end elevational view illustrating certain constructional details of the apparatus.

Referring in detail to the drawings, the numeral 10 indicates a frame of rectangular formation, and the frame 10 includes a pair of vertically disposed spaced parallel uprights or side bars 11 and 12. Extending between the lower ends of the side bars 11 and 12 and secured thereto is a horizontally disposed base or bottom piece 13. Extending between the upper ends of the side bars 11 and 12 and secured thereto is a top piece 14, and arranged in spaced parallel relation below the top piece 14 is a crosspiece 15, and these elements coact to define a compartment 16 for a purpose to be later described. Side walls 17 may be releasably arranged on opposite sides of the compartment 16.

Supported on the crosspiece 15 and arranged in the compartment 16 is a tank 18 which is adapted to hold a quantity of oil or fluid which is to be dispensed onto the cattle, hogs or the like. A filling cap 19 is connected to the tank 18 so that additional oil can be placed in the tank 18 when the level decreases below a predetermined level.

The cattle or hog oiler of the present invention further includes a pair of hingedly mounted gates 20 which each have a partial protective covering 21 thereon, and the gates 20 are hingedly connected to the frame 10 through the medium of hinge constructions 22. The hog oiler of the present invention is adapted to be arranged in a suitable opening in a fence 23, but it is to be understood that the cattle oiler or hog oiler can be arranged in any desired location.

An eyelet 24 extends upwardly from each of the gates 20, and a first chain 25 extends from one of the eyelets 24 and is trained over a pulley 30 which is journaled in the side bar 12 by means of a pin 31, and a weight 32 is connected to the chain 25, Figure 1. A second chain 26 has a portion thereof arranged in crisscross relation with a portion of the chain 25, and the chain 26 is connected to a similar eyelet on the upper end of the other swinging gate 20. The chain 26 is trained over a pulley 27 which is journaled in the side bar 11 by means of a pin 28, and the chain 26 is connected to the upper end of a weight 29.

A portion of the chain 25 engages a guide roller or pulley 33 which is connected to the side bar 12 through the medium of a bracket 34, and the upper end of the chain 25 is connected to a link 35 which is pivotally connected to the side bar 12 as at 36. A portion of the link 35 is arranged in engagement with a movable lever 37, and the lever 37 has a weight 38 adjustably mounted thereon, the weight 38 being retained immobile in its various adjusted positions by means of a securing element 39. The lever 37 is pivotally connected to the side bar 11 through the medium of a pivot unit 40.

A piston rod 41 has its upper end connected to the lever 37 as at 42, and the rod 41 serves to actuate or move a piston or plunger 43 which is arranged in a pump or cylinder 44. A first conduit 45 extends from the fluid holding tank 18 to the pump 44, and the conduit 45 has a check valve 46 arranged therein. A second conduit 47 leads from the pump 44, and the conduit 47 also has a check valve 48 therein, the conduit 47 being provided with a downwardly extending portion 49 which is adapted to dispense oil onto the hogs as the hogs move through or pass the gates 20.

From the foregoing, it is apparent that there has been provided an apparatus which is especially suitable for use in applying oil to hogs, or other animals or cattle. In use, the device is adapted to be positioned in a suitable opening in a fence such as the fence 23, or, it can be arranged in any other location. The tank 18 is adapted to hold a quantity of oil which is to be applied to the hogs or animals, and normally the parts are in the position shown in Figure 1. Then, when an animal such as a hog passes through the frame 10, the gates 20 are moved from the position shown in Figure 1 to the position shown in Figure 2, or from the position shown in Figure 4 to the position shown in Figure 5. As these gates 20 are moved open by the animal, the weights 29 and 32 are raised and the link 35 is pivoted in a clockwise direction about the pin 36. Then, the weight 38 will cause the lever 37 to move in a counterclockwise direction about the pivot pin 40 so that the rod 41 and piston 43 will be moved downwardly in the cylinder 44. This downward movement of the piston 43 will cause the oil to be dispensed down through the vertical portion 49 of the conduit 47 onto the animal passing through the gates 20. After the animal passes beyond the gates, the pair of weights 29 and 32 will return the parts from the position shown in Figure 2 to the position shown in Figure 1.

The cylinder pump 44 is supported on the crosspiece 15. The check valve 46 lets oil pass from the tank 18 to the pump 44, and the check valve 48 lets oil pass out through the conduit 47 when the piston 43 moves up. When the piston 43 moves down, the check valve 46 closes, and the check valve 48 opens so that the oil will pass down through the conduit 47 onto the back of the hogs or cattle. The lever 37 is connected to the rod 41 which operates the piston 43. When the doors or gates 20 are open, the chain 25 raises the weight 32 so that the link 35 is moved and this permits the lever 37 to move down due to the weight of the members 38 so that the piston 43 is moved down in the cylinder 44. Then, the valve 48 opens and the oil passes out through the conduit onto the hogs. When the doors close as the hog leaves the device, the weights 32 and 29 again move down and pull the members closed so that the parts will be returned to the position shown in Figure 1 and this movement of the piston 43 will cause more oil to flow from the tank 18 into the cylinder 44.

The oiler works effectively on animals or hogs of different sizes whether they are large or small, and the device is easy to operate and automatic in operation. Thus, when a hog passes through the doors or gates, the stream of oil strikes his back and runs down his sides and penetrates the various wrinkles where vermin breed and hatch so that the hog is quickly and thoroughly cleaned up. The device dispenses an exact or predetermined quantity of oil and with the present invention, entire herds can be kept clean easily. The device is easy to install and can be quickly set up and requires a minimum amount of upkeep and has a construction so that it will not readily get out of order. The device can be set up in the gateway or in a hog house door. By oiling the hogs, the hogs will have an increased value and will be healthier and the clean healthy hogs will grow faster, put on weight and the hogs will be kept in better condition so that they will be free of vermin or the like. Each hog gets the exact amount of oil that is necessary and the various parts such as the weight 38 can be shifted on the lever 37 by loosening the set screw 39 whereby an adjustment of the device is permitted.

What is claimed is:

In a hog oiler, a frame of rectangular formation including a pair of vertically disposed spaced parallel side bars, a horizontally disposed base extending between the lower ends of said side bars and secured thereto, a top piece extending between the upper ends of said side bars and secured thereto, a horizontally disposed crosspiece arranged below said top piece and secured to said side bars, a pair of doors hingedly connected to the inner portions of said side bars, each of said doors having a partial protective covering thereon, a first pulley supported by each of said side bars, a first and second chain arranged in crisscross relation with respect to each other, eyelets extending upwardly from said doors, said chains each having an end thereof connected to the eyelets on said doors, a weight arranged externally of said frame and connected to said chain, a fluid holding tank supported on said crosspiece, a first conduit extending from said tank and having a check valve therein, a pump supported by said crosspiece and connected to said first conduit, a movable lever having one end pivotally connected to said bar, a weight member adjustably mounted on said lever, a securing element for maintaining said weight member immobile in its adjusted position on said lever a pump rod extending upwardly from said pump and connected to said lever, a link pivotally connected to said frame and having a portion thereof adapted to engage said lever, said link being connected to one of said chains, and a second conduit extending from said pump and having a check valve therein, and said second conduit including a downwardly extending portion for dispensing fluid onto the cattle passing between the doors.

References Cited in the file of this patent

UNITED STATES PATENTS

| | | |
|---|---|---|
| 1,577,435 | Abbott | Mar. 23, 1926 |
| 2,020,063 | Kalina | Nov. 5, 1935 |
| 2,632,063 | Peterson | Mar. 17, 1953 |

FOREIGN PATENTS

| | | |
|---|---|---|
| 519,854 | Canada | Dec. 27, 1955 |
| 779,581 | Great Britain | July 24, 1957 |